(12) United States Patent
Wu

(10) Patent No.: US 12,461,981 B2
(45) Date of Patent: Nov. 4, 2025

(54) METHOD AND APPARATUS FOR DISPLAYING SEARCH RESULT, AND METHOD AND APPARATUS FOR PROCESSING SEARCH REQUEST

(71) Applicant: BEIJING BYTEDANCE NETWORK TECHNOLOGY CO., LTD., Beijing (CN)

(72) Inventor: Yujie Wu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/760,992

(22) Filed: Jul. 1, 2024

(65) Prior Publication Data

US 2024/0354353 A1 Oct. 24, 2024

Related U.S. Application Data

(63) Continuation of application No. PCT/CN2023/083230, filed on Mar. 23, 2023.

(30) Foreign Application Priority Data

Apr. 29, 2022 (CN) .......................... 202210466622.8

(51) Int. Cl.
*G06F 7/02* (2006.01)
*G06F 16/00* (2019.01)
(Continued)

(52) U.S. Cl.
CPC ........ *G06F 16/9538* (2019.01); *G06F 16/906* (2019.01); *G06F 16/9535* (2019.01)

(58) Field of Classification Search
CPC . G06F 16/9538; G06F 16/906; G06F 16/9535
See application file for complete search history.

(56) References Cited

U.S. PATENT DOCUMENTS 11,238,515 B1 2/2022 de Mesa et al.
11,301,540 B1 4/2022 Boteanu et al.
(Continued)

FOREIGN PATENT DOCUMENTS

CN 102591972 A 7/2012
CN 102760144 A 10/2012
(Continued)

OTHER PUBLICATIONS

International Patent Application No. PCT/CN2023/083230; Int'l Search Report; dated Jun. 20, 2023; 3 pages.
(Continued)

*Primary Examiner* — Bruce M Moser
(74) *Attorney, Agent, or Firm* — BakerHostetler

(57) ABSTRACT

The disclosure provides a method and apparatus for displaying a search result, and a method and apparatus for processing a search request. The method for displaying a search result includes: receiving search information, where the search information at least includes a keyword for characterizing a target object, and the target object belongs to a target category; obtaining parameter information and key feature information of a first target attribute of the target object; and displaying the parameter information and the key feature information of the first target attribute in a first area of a search result page.

20 Claims, 8 Drawing Sheets

(51) Int. Cl.
*G06F 16/906* (2019.01)
*G06F 16/9535* (2019.01)
*G06F 16/9538* (2019.01)

(56) References Cited

U.S. PATENT DOCUMENTS

| | | | |
|---|---|---|---|
| 11,676,192 B1* | 6/2023 | Moore | G06Q 30/0631 705/26.7 |
| 2013/0104063 A1 | 4/2013 | Legris | |
| 2019/0180295 A1* | 6/2019 | Hartnell | G06F 17/18 |
| 2019/0318407 A1* | 10/2019 | Giridhari | G06Q 30/0627 |
| 2021/0034688 A1* | 2/2021 | Pande | G06F 16/735 |
| 2021/0374195 A1 | 12/2021 | Chen et al. | |
| 2022/0129511 A1* | 4/2022 | Poreh | G06F 16/9535 |
| 2022/0180404 A1* | 6/2022 | Choi | G06Q 30/0275 |

FOREIGN PATENT DOCUMENTS

| | | |
|---|---|---|
| CN | 109801119 A | 5/2019 |
| CN | 110750705 A | 2/2020 |
| CN | 111695022 A | 9/2020 |
| CN | 111753180 A | 10/2020 |
| CN | 113392308 A | 9/2021 |
| CN | 114168865 A | 3/2022 |
| CN | 114255108 A | 3/2022 |
| CN | 114840781 A | 8/2022 |
| WO | WO 2015/058599 A1 | 4/2015 |

OTHER PUBLICATIONS

Q. Wen; "Challenge and Opportunity for Mobile Search"; All Journals; vol. 8; 2013; p. 7-10 (English Abstract).
Wang et al.; "Modern library construction"; Shenyang Press; Oct. 2012; 7 pages (contains English Translation).
Zhou et al.; "Software human subject analysis and information retrieval technology"; Beijing University of Posts and Telecommunications Press; Aug. 2012; 7 pages (contains English Translation).
European Patent Application No. 23794886.4; Extended Search Report; dated Feb. 26, 2025; 8 pages.

* cited by examiner

METHOD AND APPARATUS FOR DISPLAYING SEARCH RESULT, AND METHOD AND APPARATUS FOR PROCESSING SEARCH REQUEST

CROSS-REFERENCE TO RELATED APPLICATION(S)

The application is a continuation of PCT International Application No. PCT/CN2023/083230, filed Mar. 23, 2023, which claims the priority to Chinese Patent Application No. 202210466622.8 filed with the Chinese Patent Office on Apr. 29, 2022, and entitled "Method and Apparatus for Displaying Search Result, and Method and Apparatus for Processing Search Request", which are incorporated herein by reference in their entireties.

FIELD

The disclosure relates to the technical field of computers, in particular to a method and apparatus for displaying a search result, and a method and apparatus for processing a search request.

BACKGROUND

Users generally search for an item in all dimensions for the knowledge of various types of its information. For example, for related information, the users need to search for a target mobile phone of a model from the aspects of its battery, screen, price and processor. In this way, the users can merely obtain details of the item through repeated search, resulting in low search efficiency.

SUMMARY

Examples of the disclosure at least provide a method and apparatus for displaying a search result, and a method and apparatus for processing a search request.

In a first aspect, the example of the disclosure provides a method for displaying a search result. The method includes:
 receiving search information, where the search information at least includes a keyword for characterizing a target object, and the target object belongs to a target category;
 obtaining parameter information and key feature information of a first target attribute of the target object; and
 displaying the parameter information and the key feature information of the first target attribute in a first area of a search result page.

In a possible embodiment, the first target attribute is an attribute that affects a decision on the target object.

In a possible embodiment, the method further includes:
 obtaining a first search result corresponding to the parameter information of the first target attribute, where a content of the first search result supports the parameter information of the first target attribute; and displaying number information of the first search result in the first area.

In a possible embodiment, the method further includes:
 obtaining a second search result corresponding to the key feature information of the first target attribute, where a content of the second search result supports the key feature information of the first target attribute; and displaying a preview content of the second search result in a second area of the search result page.

In a possible embodiment, the method further includes: displaying the parameter information of the first target attribute in the first area, and displaying the key feature information corresponding to the parameter information of the first target attribute at a position corresponding to the parameter information of the first target attribute.

In a possible embodiment, the method further includes:
 displaying a target preview content of a second search result corresponding to triggered key feature information in the second area in response to a triggering operation on any key feature information, where the target preview content is obtained by clustering the second search results that are obtained by initiating, based on the triggered key feature information, a search.

In a possible embodiment, the method further includes:
 displaying a first search result corresponding to parameter information of any first target attribute and highlighting key feature information in the first search result in response to a triggering operation on number information of the first search result corresponding to the parameter information of the any first target attribute.

In a possible embodiment, target key feature information in the key feature information carries mark information, where the target key feature information is key feature information satisfying a first preset condition of corresponding popularity information; and
 after the displaying the parameter information and the key feature information of the first target attribute in a first area of a search result page, the method further includes:
 displaying the target key feature information in a marked manner.

In a second aspect, the example of the disclosure provides a method for processing a search request. The method includes:
 receiving a search request on a target object sent by a user terminal, where search information is carried in the search request, the search information at least includes a keyword for characterizing the target object, and the target object belongs to a target category; and
 determining a target search result matching the search request and sending the search result to the user terminal, where the target search result includes parameter information and key feature information of a first target attribute of the target object.

In a possible embodiment, the method further includes: determining the parameter information of the first target attribute of the target object according to a method as follows:
 determining target template search information matching the search request, initiating a search based on the target template search information, and determining a third search result;
 extracting first initial answer information in the third search result that is included in respective search results and corresponds to the target template search information;
 determining key point information of the first initial answer information, and clustering the key point information; and
 determining the first target attribute of the target object and the parameter information of the first target attribute based on a first clustering result.

In a possible embodiment, the method further includes: determining the key feature information of the first target attribute according to a method as follows:

initiating a search based on the keyword of the target object included in the search information, and the first target attribute, and determining a fourth search result;

extracting second initial answer information in the fourth search result that is included in respective search results and is related to the first target attribute of the target object;

determining key point information of the second initial answer information, and clustering the key point information; and determining the key feature information of the first target attribute based on a second clustering result.

In a third aspect, the example of the disclosure further provides an apparatus for displaying a search result. The apparatus includes:

a first reception module configured to receive search information, where the search information at least includes a keyword for characterizing a target object, and the target object belongs to a target category;

an obtainment module configured to obtain parameter information and key feature information of a first target attribute of the target object; and a display module configured to display the parameter information and the key feature information of the first target attribute in a first area of a search result page.

In a possible embodiment, the first target attribute is an attribute that affects a decision on the target object.

In a possible embodiment, the obtainment module is further configured to:

obtain a first search result corresponding to the parameter information of the first target attribute, where a content of the first search result supports the parameter information of the first target attribute; and display number information of the first search result in the first area.

In a possible embodiment, the obtainment module is further configured to:

obtain a second search result corresponding to the key feature information of the first target attribute, where a content of the second search result supports the key feature information of the first target attribute; and display a preview content of the second search result in a second area of the search result page.

In a possible embodiment, the display module is further configured to:

display the parameter information of the first target attribute in the first area, and display the key feature information corresponding to the parameter information of the first target attribute at a position corresponding to the parameter information of the first target attribute.

In a possible embodiment, the display module is further configured to:

display a target preview content of a second search result corresponding to triggered key feature information in the second area in response to a triggering operation on any key feature information, where the target preview content is obtained by clustering the second search results that are obtained by initiating, based on the triggered key feature information, a search.

In a possible embodiment, the display module is further configured to:

display a first search result corresponding to parameter information of any first target attribute and highlight key feature information in the first search result in response to a triggering operation on number information of the first search result corresponding to the parameter information of the any first target attribute.

In a possible embodiment, target key feature information in the key feature information carries mark information, where the target key feature information is key feature information satisfying a first preset condition of corresponding popularity information; and after the displaying the parameter information and the key feature information of the first target attribute in a first area of a search result page, the display module is further configured to:

display the target key feature information in a marked manner.

In a fourth aspect, the example of the disclosure further provides an apparatus for processing a search request. The apparatus includes:

a second reception module configured to receive a search request on a target object sent by a user terminal, where search information is carried in the search request, the search information at least includes a keyword for characterizing the target object, and the target object belongs to a target category; and a sending module configured to determine a target search result matching the search request and send the search result to the user terminal, where the target search result includes parameter information and key feature information of a first target attribute of the target object.

In a possible embodiment, the sending module is further configured to determine the parameter information of the first target attribute of the target object according to a method as follows:

determining target template search information matching the search request, initiating a search based on the target template search information, and determining a third search result;

extracting first initial answer information in the third search result that is included in respective search results and corresponds to the target template search information;

determining key point information of the first initial answer information, and clustering the key point information; and determining the first target attribute of the target object and the parameter information of the first target attribute based on a first clustering result.

In a possible embodiment, the sending module is further configured to determine the key feature information of the first target attribute according to a method as follows:

initiating a search based on the keyword of the target object included in the search information, and the first target attribute, and determining a fourth search result;

extracting second initial answer information in the fourth search result that is included in respective search results and is related to the first target attribute of the target object;

determining key point information of the second initial answer information, and clustering the key point information; and determining the key feature information of the first target attribute based on a second clustering result.

In a fifth aspect, the example of the disclosure further provides a computer device. The computer device includes: a processor, a storage and a bus, where the storage stores a machine-readable instruction executable by the processor, the processor communicates with the storage through the bus when the computer device runs, and the machine-readable instruction executes steps in the first aspect or any possible embodiment in the first aspect or steps in the second aspect or any possible embodiment in the second aspect when executed by the processor.

In a sixth aspect, the example of the disclosure further provides a computer-readable storage medium. The computer-readable storage medium stores a computer program, where the computer program executes steps in the first aspect or any possible embodiment in the first aspect or steps in the second aspect or any possible embodiment in the second aspect when run by a processor.

According to the method and apparatus for displaying a search result, and the method and apparatus for processing a search request provided by the examples of the disclosure, the search information may be obtained, and the parameter information and the key feature information of the first target attribute of the target object may be obtained. Then, the parameter information and the key feature information of the first target attribute are displayed in the first area of the search result page. Since the parameter information and the key feature information of the first target attribute are estimated information in which the user may be interested, this method can display a content for which the user wants to search for the user, and can further directly display the parameter information and the key feature information in which the user may be interested. Thus, the user is prevented from re-initiating the search and search efficiency is improved.

In order to make the above objectives, features, and advantages of the disclosure clearer and more comprehensible, detailed description will be made below with reference to preferred examples and in conjunction with accompanying drawings.

BRIEF DESCRIPTION OF THE DRAWINGS

In order to describe technical solutions of examples of the disclosure more clearly, accompanying drawings required by the examples will be briefly introduced below. The drawings herein are incorporated into the description as a constituent part of the description, illustrate examples conforming to the disclosure, and serve to describe the technical solutions of the disclosure along with the description. It should be understood that the following accompanying drawings merely show some examples of the disclosure, and should not be considered as limitation to the scope accordingly. A person of ordinary skill in the art can still derive other relevant accompanying drawings from these accompanying drawings without creative efforts.

DETAILED DESCRIPTION OF EMBODIMENTS

Figure 1:
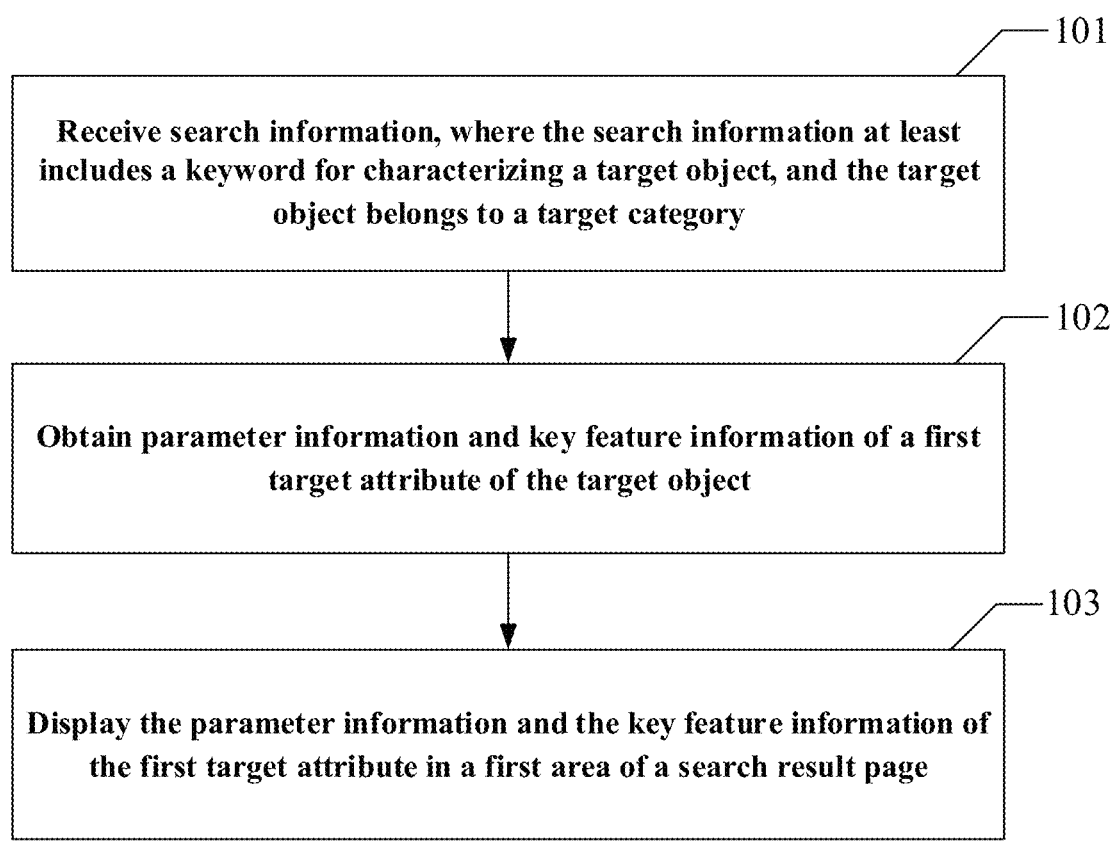
FIG. 1 shows a flowchart of a method for displaying a search result according to an example of the disclosure.

To make objectives, technical solutions, and advantages of examples of the disclosure clearer, the technical solutions in the examples of the disclosure will be clearly and completely described below with reference to accompanying drawings in the examples of the disclosure. Apparently, the examples described are merely some examples rather than all examples of the disclosure. In general, components that are described and shown in the accompanying drawings herein in the examples of the disclosure can be arranged and designed in various configurations. Thus, the detailed description of the examples of the disclosure as provided in the accompanying drawings below is not intended to limit the protection scope claimed by the disclosure, but merely denotes selected examples of the disclosure. All other examples derived by a person of ordinary skill in the art from the examples of the disclosure without creative efforts should fall within the protection scope of the disclosure.

Users generally search for an item in all dimensions for the knowledge of various types of its information. For example, for related information, the users need to search for a target mobile phone of a model from the aspects of its battery, screen, price and processor. In this way, the users can merely obtain details of the item through repeated search, resulting in low search efficiency.

Based on the research described above, the disclosure provides a method and apparatus for displaying a search result, and a method and apparatus for processing a search request. Search information may be obtained, and parameter information and key feature information of a first target attribute of a target object may be obtained. Then, the parameter information and the key feature information of the first target attribute are displayed in a first area of a search result page. Since the parameter information and the key feature information of the first target attribute are estimated information in which the user may be interested, this method can display a content for which the user wants to search for the user, and can further directly display the parameter information and the key feature information in which the user may be interested. Thus, the user is prevented from re-initiating the search and search efficiency is improved.

It should be noted that similar reference numerals and letters indicate similar items in the following accompanying drawings, and once defined in one accompanying drawing, an item does not need to further defined and explained in subsequent accompanying drawings.

The term "and/or" herein merely describes an association and indicates existence of three relations, for example, A and/or B can mean separate existence of A, existence of both A and B, and separate existence of B. In addition, the term "at least one" herein indicates any one or any combination of at least two of a variety, for example, including at least one of A, B and C can indicate including any one or more elements selected from a set of A, B and C.

In order to understand this example conveniently, the method for displaying a search result disclosed according to the example of the disclosure is described in detail at first. An execution subject of the method for displaying a search result according to the example of the disclosure is a user terminal. The user terminal may be, for example, a smart phone, a portable android device and a personal computer.

As shown in FIG. 1, a flowchart of a method for displaying a search result is shown according to an example of the disclosure. The method includes steps 101-103.

Step 101. Search information is received, where the search information at least includes a keyword for characterizing a target object, and the target object belongs to a target category.

Step 102. Parameter information and key feature information of a first target attribute of the target object are obtained.

Step 103. The parameter information and the key feature information of the first target attribute are displayed in a first area of a search result page.

The steps are described in detail blow:

In Step 101:

The target category may be a category that needs to be introduced through a plurality of parameters, and may illustratively include a digital product category, an information technology category, etc. The target object may be an item in an item library stored on a server.

Specifically, the user terminal may display a search input box for inputting the search information. The user terminal may further display a search symbol corresponding to the search input box. A search triggering operation may be an operation for triggering the search symbol.

The search information at least includes the keyword configured to characterize the target object. Illustratively, if the keyword configured to characterize the target object is a mobile phone A, the search information may be "what are highlights of the mobile phone A?".

In Step 102:

The first target attribute is an attribute that affects a decision on the target object. For example, when selecting a mobile phone, the user may pay attention to a size of a storage space, a camera function, etc. of the mobile phone. The parameter information of the first target attribute is a specific value of the first target attribute of the target object. Illustratively, if the target object is the mobile phone A, the first target attribute may include a battery, a screen, a price, a processor, a camera, etc. The parameter information of the first target attribute of the "battery" may be "3000 mA", etc. If the target object is a car B, the first target attribute may include a displacement, a wheel base, fuel consumption, etc. The parameter information of the first target attribute of the "displacement" may be "1.5 T", etc.

The key feature information refers to information configured to reflect a key feature of the first target attribute under the first target attribute. Illustratively, if the target object is the mobile phone A and the first target attribute is a chip, the key feature information of the first target attribute of the "chip" may be "GPU performance improvement".

Figure 2A:
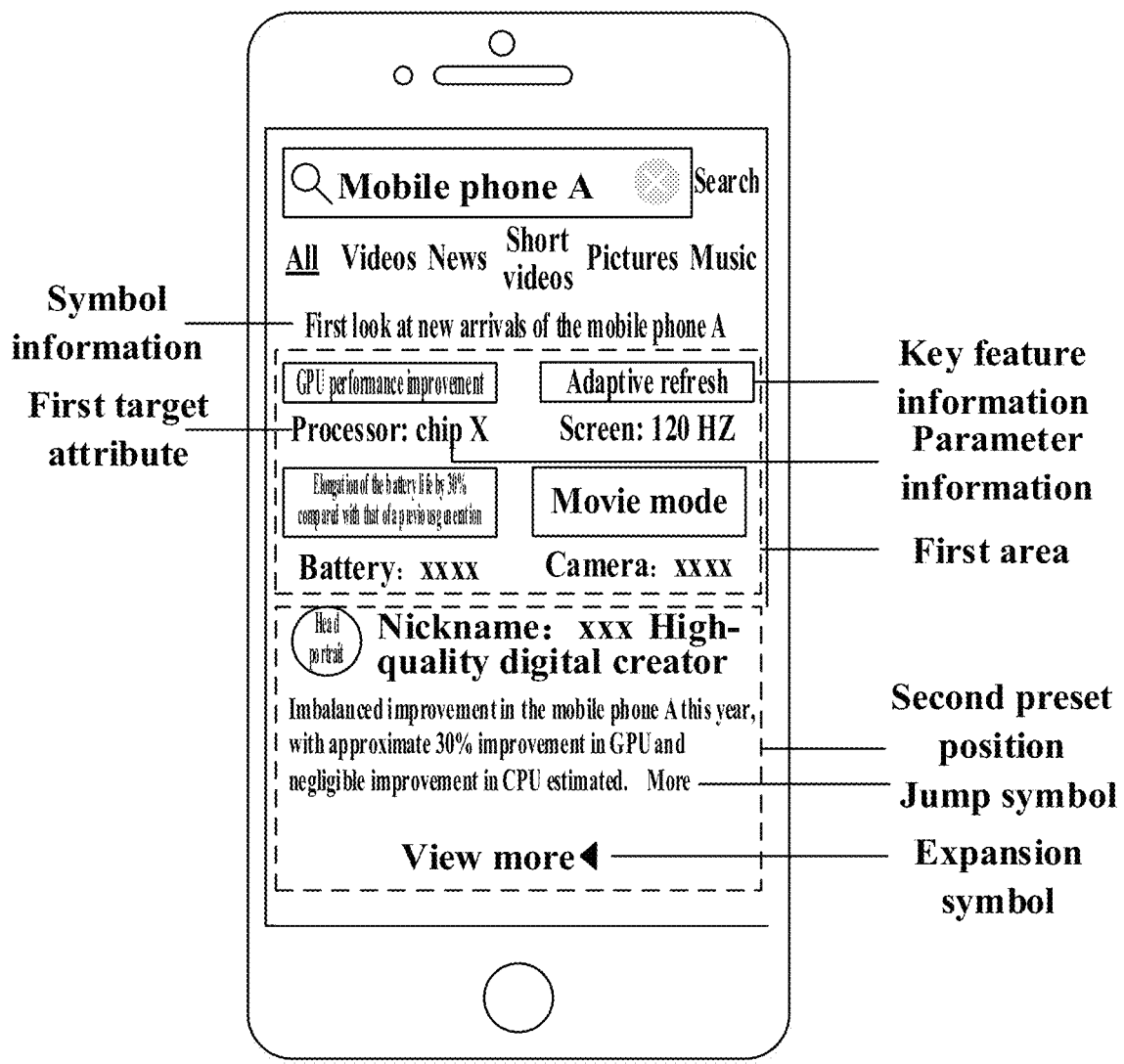
FIG. 2a shows a schematic diagram of a search result page according to an example of the disclosure.
Figure 3:
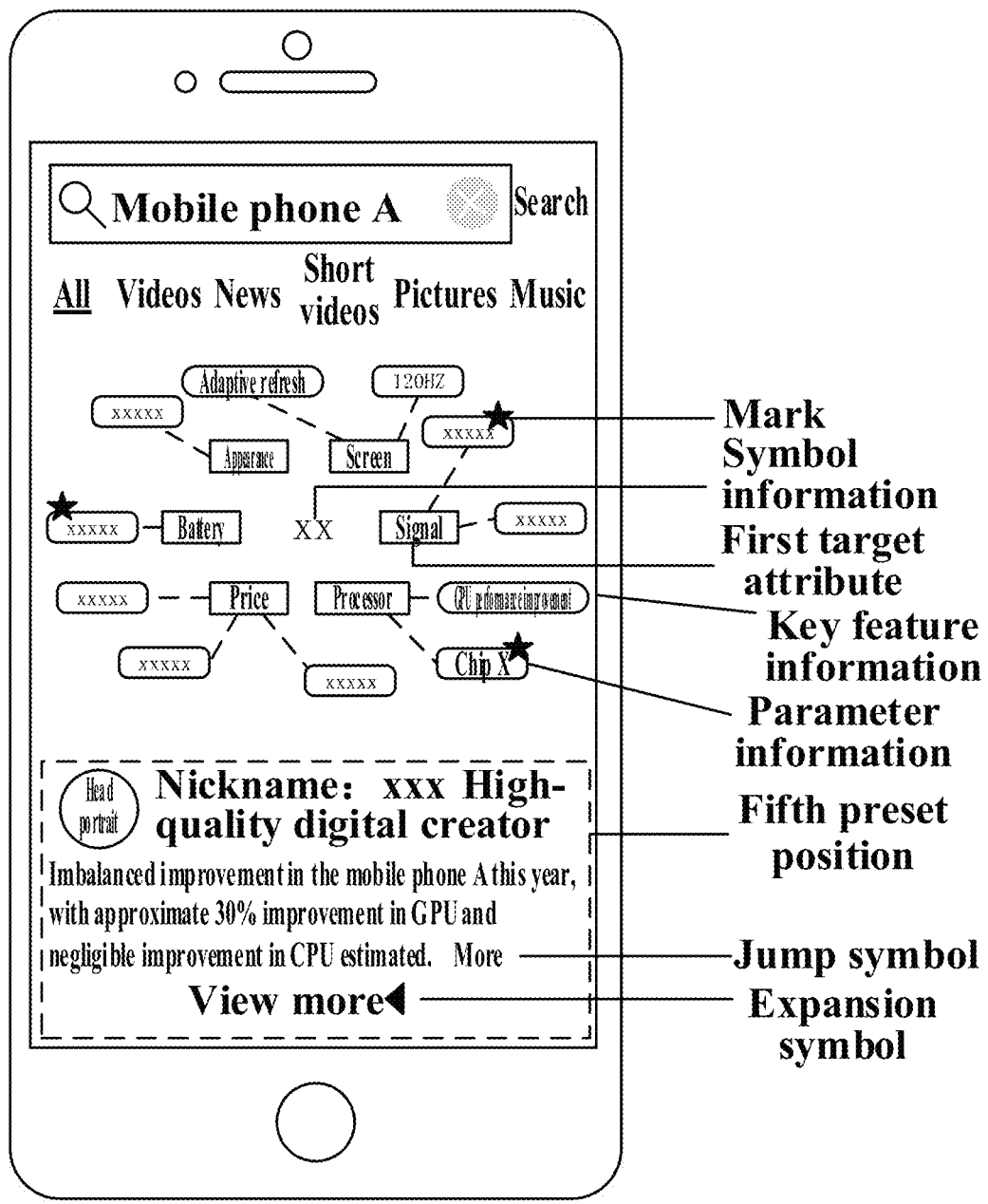
FIG. 3 shows another schematic diagram of a search result page according to an example of the disclosure.

In Step 103:

Illustratively, the search result page may be as shown in FIG. 2a or 3, the first target attribute includes a "processor", a "screen", a "battery", etc. The parameter information of the first target attribute includes a "chip X", "120 HZ", etc. The key feature information of the first target attribute includes "adaptive refresh" and "GPU performance improvement", etc.

In a possible embodiment, the search result page may also display symbol information of the target object. The symbol information of the target object may be a name of the target object. Illustratively, if the target object is the mobile phone A, the symbol information may be the "mobile phone A" and the symbol information may also be a title of the search result of the target object, as shown in FIG. 2a, "first look at new arrivals of the mobile phone A".

In a possible embodiment, displaying the parameter information and the key feature information of the first target attribute of the target object on the search result page may indicate that the parameter information and the key feature information of the first target attribute of the target object are displayed at a first place of the search result page.

A specific display method is introduced below with two display methods as examples.

Method 1:

In a possible embodiment, the search result page may be shown in FIG. 2a, the parameter information of the first target attribute is displayed in the first area, and the key feature information corresponding to the parameter information of the first target attribute is displayed at a position corresponding to the parameter information of the first target attribute.

Specifically, when the parameter information of the first target attribute is displayed in the first area, a display template may be set as "AA: BB", where AA denotes the first target attribute and BB denotes the parameter information. The key feature information of the first target attribute may be displayed above the first target attribute. Then, when the search result page is generated, the display template is filled with the first target attribute, and the parameter information and the key feature information of the first target attribute.

Illustratively, if any of the first target attributes is the "processor" and the parameter information under the first target attribute is the "chip X", "processor: chip X" may be displayed.

Further, when the first target attribute is displayed, all first target attributes may be displayed, or a part of the first target attributes may be displayed. Illustratively, if four display positions of the first target attributes are arranged in the search result page, merely four first target attributes may be displayed when a number of the first target attributes is greater than four (for example, six). In a possible embodiment, an expansion symbol may further be displayed in the search result page, and all the first target attributes may be displayed in response to a triggering operation on the expansion symbol.

In a possible embodiment, popularity information of the first target attributes may be computed at first, and then the first target attributes may be ordered in a descending manner according to respective popularity information, and displayed in this order. The popularity information may be determined based on at least one of a total search score, a search score within preset time, and a user comment score.

Specifically, historical search requests of the user may be stored in the server. The total search score may be determined by counting a number of searches of search requests for the first target attribute. For example, if there are 20 search requests for the first target attribute in a search history, the total search score may be determined to be 20 points.

The search score within the preset time may be determined by counting a number of search of search requests for the first target attribute within the preset time range. Illustratively, if the preset time range is 2 minutes and a short-time search score is determined at 8:03, 50 search requests for the first target attribute are found from 8:00 to 8:02 at first, and the search score within the preset time is 50 points.

Herein, it should be noted that the number of searches for the first target attribute is greater than the number of searches for the first target attribute within the preset time.

The user comment score may be determined based on a number of comments made by the user on the first target attribute. Illustratively, if there are 30 user comments on the first target attribute, the user comment score is 30 points.

In another possible embodiment, the number of searches include a number of early searches and a number of later searches. When the total search score is determined, different weights may be set for the number of early searches and the number of later searches, and then the total search score may be computed based on the weights corresponding to the number of early searches and the number of early searches.

The number of early searches is configured to indicate a number of first searches of the search request for the first target attribute when the user searches for the target object, and the number of later searches is used to indicate a number of non-first searches of the search request for the first target attribute when the user searches for the target object. Illustratively, if the user searches for a related content of the "mobile phone A", search information of a first search is "what is a price of the mobile phone A", then the search request for the first target attribute "price" is the early search, and this search request is counted in the number of early searches. If the user searches for a related content of the "mobile phone A", search information of a first search is "latest news of the mobile phone A", and search information of a next search (search time from the first search is less than preset time) is "what is a price of the mobile phone A", then the search for the first target attribute "price" is the later search, and the search request is counted in the number of later searches.

Herein, all searches performed within a preset number of times after the early search are counted in the number of later searches. Illustratively, all searches within 10 searches after the early search are counted in the number of later searches, and a search beyond 10 searches for the target object is counted in the number of early searches again, and so on.

Further, after the total search score, the search score within the preset time and the user comment score are determined, the server may compute a popularity values of the first target attributes through a weighed sum on the total search score, the short-time search score and the user comment score, and then may send the popularity value of the first target attributes to the user terminal when sending the search result to the user terminal. Then, the user terminal may display the first target attributes based on the popularity values of the first target attributes in a descending order.

Illustratively, if the target object includes three first target attributes "screen", "battery" and "price", and corresponding popularity values of the first target attributes are 100, 50 and 60 respectively, the first target attributes may be displayed in an order of "screen", "price" and "battery" in the first area.

Method 2:

In another possible embodiment, the search result page may be as shown in FIG. 3, and the first area includes a center position, a third preset position and a fourth preset position. The symbol information of the target object may be displayed, in the center position, the first target attribute may be displayed at the third preset position (that is, an inner circle in FIG. 3) and the parameter information and the key feature information of the first target attribute may be displayed at the fourth preset position (that is, an outer circle in FIG. 3).

Herein, the first target attribute may be determined based on the search result, or the first target attribute may be preset for the target object. Illustratively, the first target attributes about the "mobile phone A" may be set as a "battery", an "appearance", a "screen", a "signal", a "price" and a "processor" in advance, and then the first target attributes may be directly displayed after responding to the search request for the "mobile phone A".

Herein, the parameter information and the key feature information that are displayed of the first target attribute may be a part of the parameter information and a part of key feature information of the first target attribute. Illustratively, ordering may be performed according to popularity information of the parameter information and the key feature information of the first target attribute, and parameter information or key feature information that has high popularity may be selected and displayed.

In a possible embodiment, the target key feature information in the key feature information carries mark information, where the target key feature information is key feature information satisfying a first preset condition of corresponding popularity information. After the parameter information and the key feature information of the first target attribute are displayed in the first area of the search result page, the target key feature information may be displayed in a marked manner.

Specifically, the first preset condition may be that the popularity information is greater than a preset popularity value illustratively, for example, the popularity information is greater than 50 w. Alternatively, the key feature information may be ordered according to respective popularity information in a descending manner, and is screened for target key feature information per a preset number of marks and displayed.

Illustratively, as shown in FIG. 3, the mark display may include background color burn, addition of a preset icon (for example, a five-pointed star icon), use of a striking font color (such as red), etc.

The two methods for displaying the parameter information and the key feature information of the first target attribute of the target object on the search result page are described. In addition, other information of the target object may also be displayed by the above two display methods with specifics as follows:

In a possible embodiment, a first search result corresponding to the parameter information of the first target attribute may be obtained. A content of the first search result supports the parameter information of the first target attribute, and then number information of the first search result is displayed in the first area.

Figure 2B:
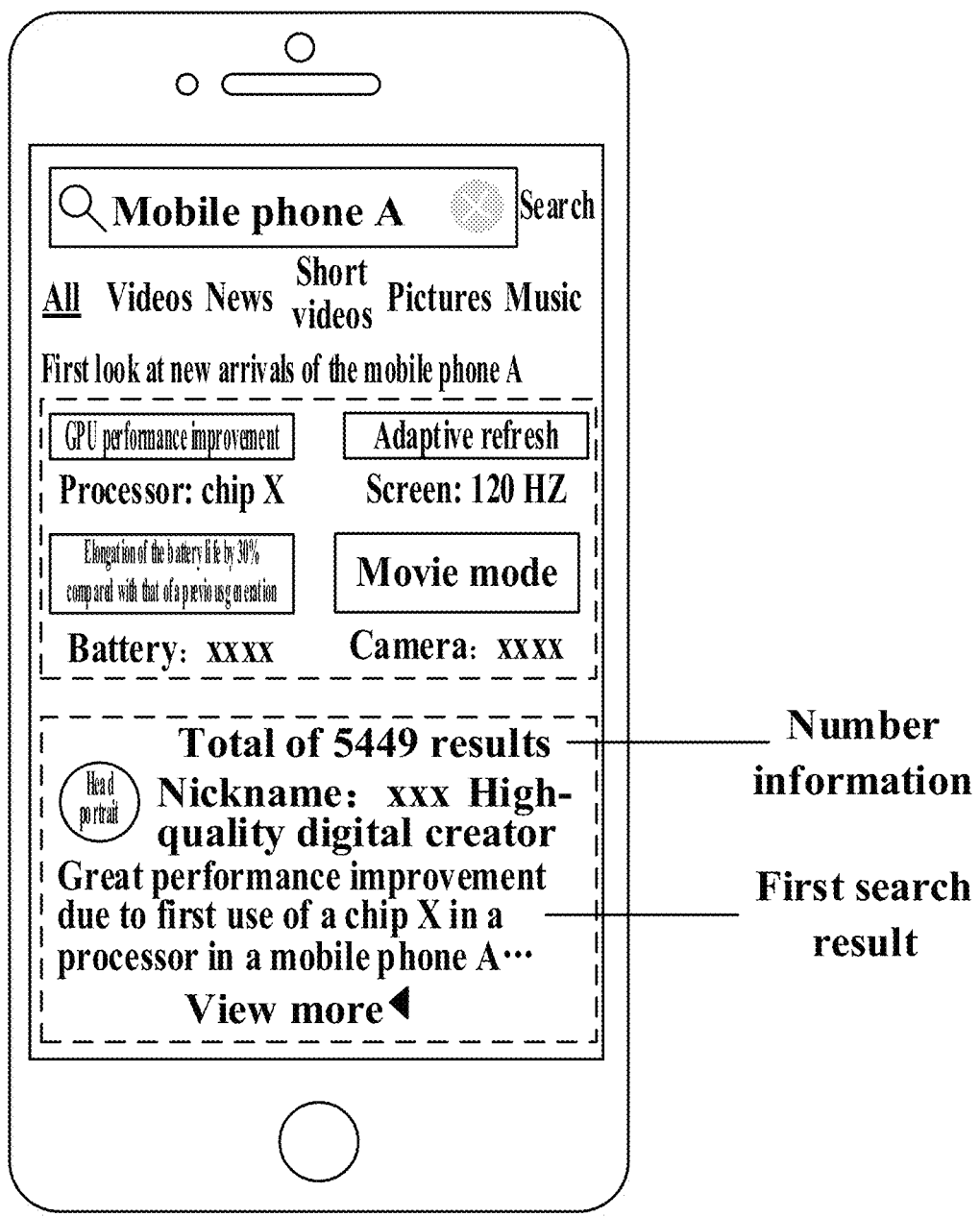
FIG. 2b shows a schematic diagram of displaying a first search result according to an example of the disclosure.

Specifically, the first search result corresponding to the parameter information of the first target attribute and the number information of the first search result may be predetermined by the server. The user may send a search result obtainment request that carries triggered parameter information to the server in response to a triggering operation on any parameter information, and then the server may send the first search result predetermined corresponding to the triggered parameter information, and the number information of the first search result to the user terminal and displayed with a display effect shown in FIG. 2b.

In a possible embodiment, the first search result corresponding to parameter information of any first target attribute is displayed and key feature information in the first search result is highlighted in response to a triggering operation on number information of the first search result corresponding to the parameter information of the any first target attribute.

Specifically, before responding to the triggering operation on the parameter information of the any first target attribute, at least one first search result corresponding to the parameter information of the first target attribute may not be displayed, or at least one first search result corresponding to default parameter information of the first target attribute may be displayed. The default parameter information of the first target attribute may be preset, or the parameter information of the first target attribute may be screened for the default parameter information of the first target attribute, for example, based on the total search score, the search score within the preset time and the user comment score. The screening method is the same as the method described above and will not be repeated herein.

In a possible embodiment, under the condition that a plurality of first search results exist, the plurality of the first search results may be ordered based on a sum of a parameter relevance and an authority score, and are screened for a first search result with a highest score for display.

In a possible embodiment, a second search result corresponding to the key feature information of the first target attribute may be obtained, where a content of the second search result supports the key feature information of the first target attribute. Then, a preview content of the second search result is displayed in a second area of the search result page.

Specifically, the second search result corresponding to the key feature information of the first target attribute and the preview content of the second search result may be predetermined by the server. The user may send a search result obtainment request that carries triggered key feature information to the server after responding to a triggering operation on any key feature information, and then the server may send the second search result predetermined corresponding to the triggered key feature information, and the preview content of the second search result to the user terminal and displayed.

In a possible embodiment, a target preview content of the second search result corresponding to the triggered key feature information is displayed in the second area in response to the triggering operation on the any key feature information, where the target preview content is obtained by clustering the second search results that are obtained by initiating, based on the triggered key feature information, a search. Specifically, a method for determining the second search result will be described below.

Specifically, before responding to the triggering operation on the any key feature information, the target preview content of the key feature information may not be displayed, or a target preview content of default key feature information may be displayed. The key feature information is screened for the default key feature information, for example, based on the total search score, the short-time search score and the user comment score. The screening method is the same as the method described above and will not be repeated herein.

The target preview content of the triggered key feature information may be displayed at a preset position (for example, a second preset position in FIG. 2a and a fifth preset position in FIG. 3) after responding to the triggering operation on any key feature information.

In a possible embodiment, under the condition that a plurality of target preview contents exist, the plurality of the target preview contents may be ordered based on a sum of a parameter relevance and an authority score, and are screened for a target preview content with a highest score for display.

In a possible embodiment, a nickname, a head portrait, an occupation (for example, digital product sales) and a title (for example, a high-quality digital domain author) of an author of the first search result or the target preview content may also be displayed.

In a possible embodiment, a jump symbol may be further displayed at a position corresponding to the first search result or the target preview content. Jumping may be performed to display of the first search result or the search result corresponding to the target preview content in response to a triggering operation on the jump symbol.

In a possible embodiment, under the condition that merely a part of the first search results or the target preview content is displayed, an expansion symbol may further be displayed. All the first search results or the target preview content may be displayed in response to the triggering operation on the expansion symbol.

Figure 4:
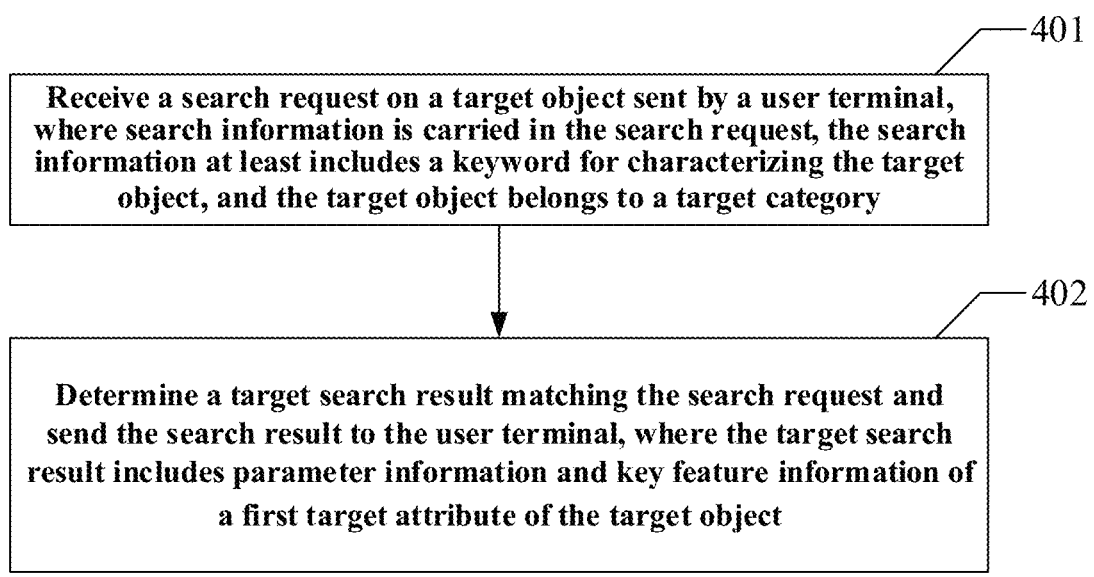
FIG. 4 shows a flowchart of a method for processing a search request according to an example of the disclosure.

Based on the same concept, the example of the disclosure further provides a method for processing a search request. The method is applied to a server. As shown in FIG. 4, a flowchart of a method for processing a search request is shown according to an example of the disclosure. The method includes steps 401-402.

Step 401: A search request on a target object sent by a user terminal is received, where search information is carried in the search request, the search information at least includes a keyword for characterizing the target object, and the target object belongs to a target category.

Step 402: A target search result matching the search request is determined and the search result is sent to the user terminal, where the target search result includes parameter information and key feature information of a first target attribute of the target object.

Figure 5:
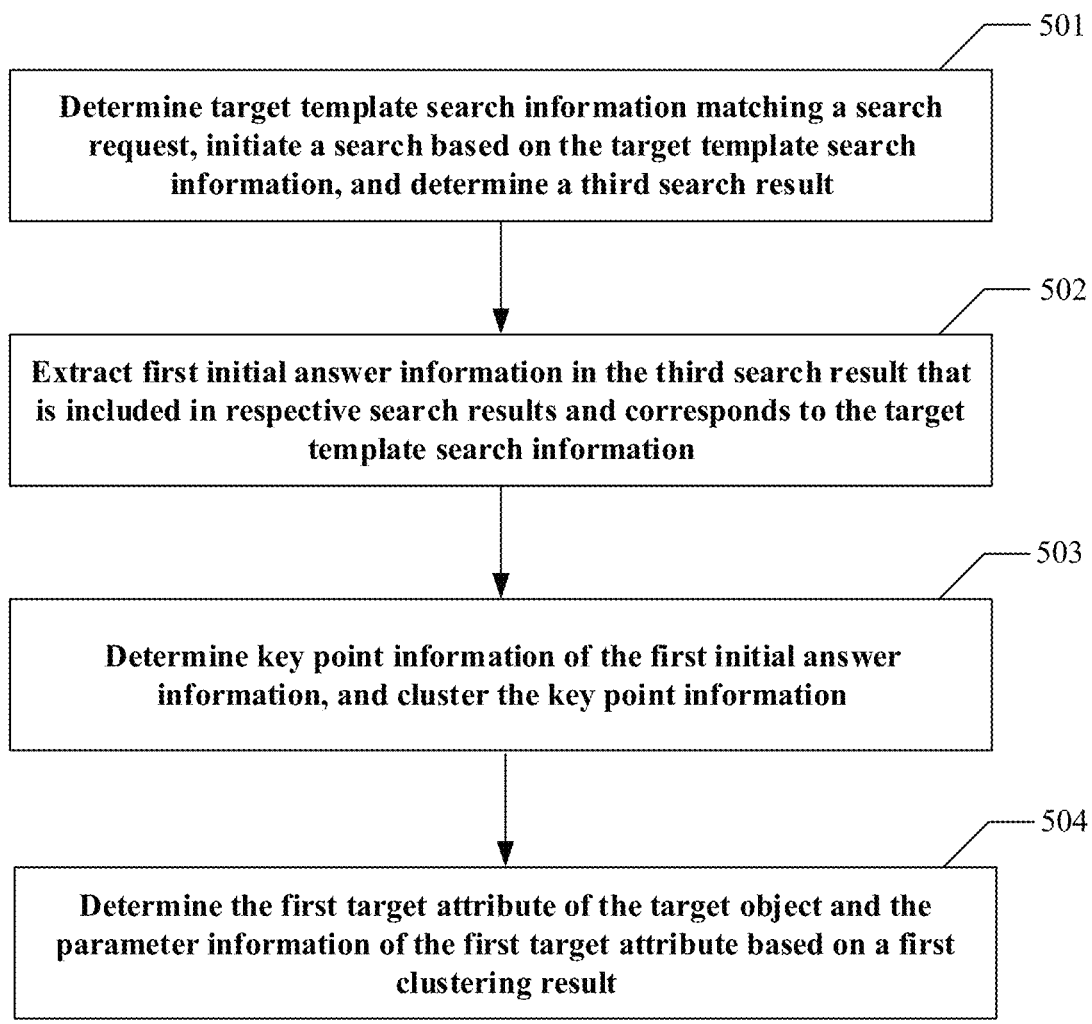
FIG. 5 shows a flowchart of a specific method for determining parameter information in a method for processing a search request according to an example of the disclosure.

The steps are described in detail blow:
In Steps 401 and 402:
In a possible embodiment, as shown in FIG. 5, the parameter information of the first target attribute of the target object may be further determined according to steps 501-504:

Step 501: Target template search information matching a search request may be determined, a search is initiated based on the target template search information, and a third search result is determined.

In a possible embodiment, a plurality of pieces of preset target template search information are stored in the server. After receiving a search request sent by a user terminal, the server may input search information carried by the search request into a pre-trained search question transformation model. The search question transformation model may identify a keyword in the search information or perform semantic analysis on the search information, so as to determine the target template search information matching the search information.

The target template search information may be a search question corresponding to the search information. Illustratively, if the search information is "a updated content of a mobile phone A", the target template search information corresponding to the search information may be "what has the mobile phone A updated this year?".

In a possible embodiment, the target template search information is set based on a method as follows: a search record and a plurality of preset target objects are stored in the server. For any target object, the target search information including the target object may be determined, a number of target searches of the same target search information is counted, and then search information with a highest number of target searches is taken as the target template search information corresponding to the target object, that is, the target template search information matching the search information.

In another possible embodiment, the target template search information corresponding to the target objects may be set manually.

Illustratively, if the target template search information is "what has the mobile phone A updated this year?", the target template search information may be used as search information to initiate a search request, and the third search result may be obtained based on the target template search information.

Step 502: First initial answer information in the third search result that is included in respective search results and corresponds to the target template search information is extracted.

Specifically, the first initial answer information may be extracted from the first search result through a pre-trained reading comprehension model.

Step 503: Key point information of the first initial answer information is determined, and the key point information is clustered.

Specifically, the key point information may be extracted from the first initial answer information through a pre-trained answer extraction model, and then the same key point information may be clustered to obtain a first clustering result.

Step 504: The first target attribute of the target object and the parameter information of the first target attribute are determined based on the first clustering result.

In a possible embodiment, when the first target attribute of the target object is determined based on the clustering result, a plurality of historical search requests corresponding to the target object may be determined at first. Assessment information of the key point information is determined based on the historical search request and the first clustering result. Key point information whose corresponding evaluation information satisfies a second preset condition is determined as the first target attribute, and a value of the first target attribute is the parameter information of the first target attribute.

Specifically, the assessment information may be determined based on a total search score, a short-time search score, and a user comment score. The plurality of historical search requests are stored in the server. A target historical search request that carries search information including the key point information may be determined at first, then the total search score and the short-time search score may be determined based on the target historical search request, and at the same time, a number of comments related to the key point information may be counted to determine the user comment score, so as to determine the user comment score. The second preset condition may be illustratively that the assessment information is greater than a seventh preset value.

In a possible embodiment, in order to prevent incompleteness or an error of the first target attribute of the target object determined based on clustering, the target category corresponding to the target object may also be determined. Then, a preset attribute range corresponding to the target category is determined, and the first target attribute is verified based on the preset attribute range.

Specifically, a plurality of target categories and preset attribute ranges corresponding to the target categories are stored in the server. Illustratively, a preset attribute range corresponding to a mobile phone category may include: a battery, a screen, a price and a processor. During verification, if the first target attribute is detected not to fall within the preset attribute range, the first target attribute that does not fall within the preset attribute range may be deleted.

Figure 6:
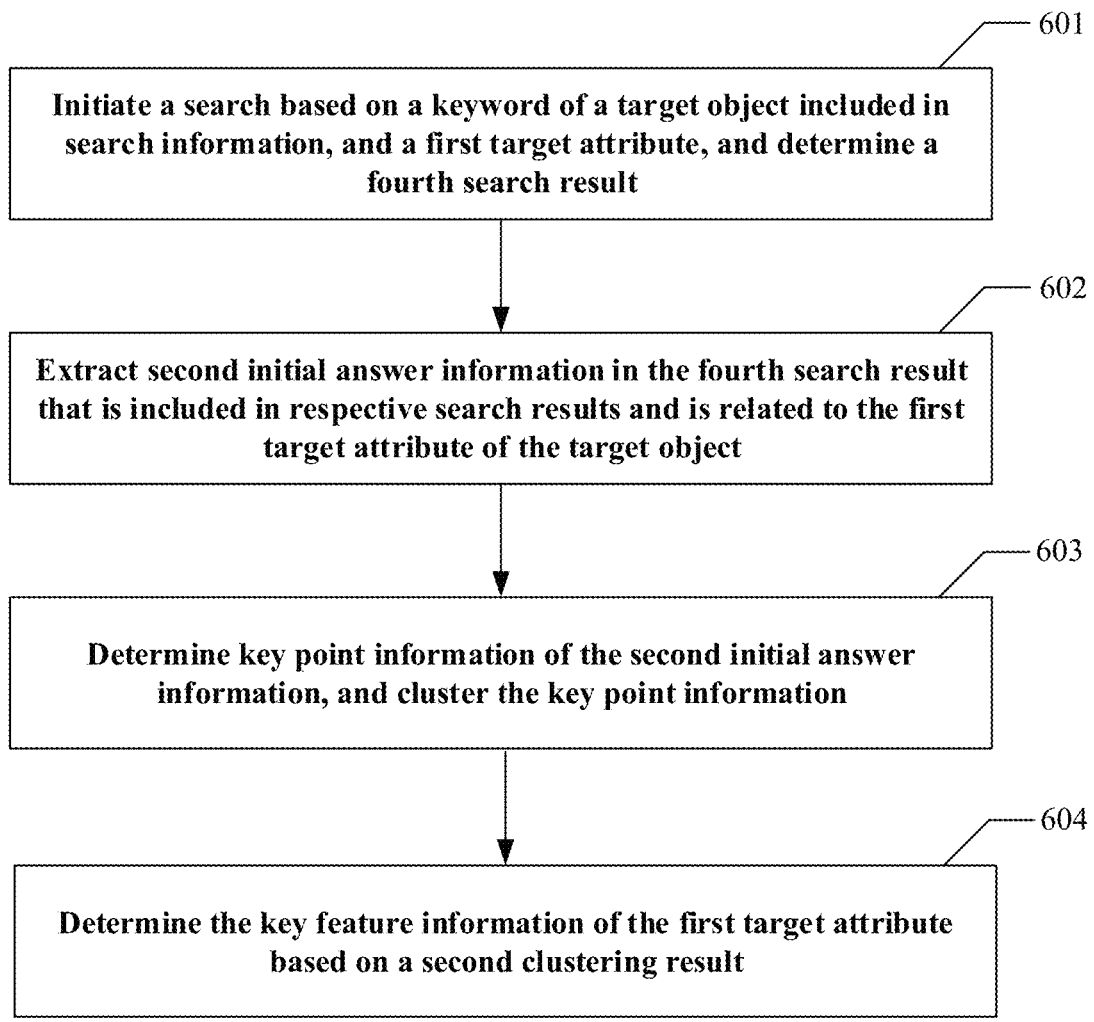
FIG. 6 shows a flowchart of a specific method for determining key feature information in a method for processing a search request according to an example of the disclosure.

In a possible embodiment, as shown in FIG. 6, the key feature information of the first target attribute may be further determined according to a method as follows:

Step 601: A search is initiated based on the keyword of the target object included in the search information, and the first target attribute, and a fourth search result is determined.

In a possible embodiment, when the search is initiated based on the keyword of the target object and the first target attribute, search information may be constructed based on the keyword of the target object and the first target attribute, and then the search request may be initiated based on the search information constructed, so as to obtain the fourth search result.

Step 602: Second initial answer information in the fourth search result that is included in respective search results and is related to the first target attribute of the target object is extracted.

Specifically, the second initial answer information may be extracted from the fourth search result through the pre-trained reading comprehension model.

Step 603: Key point information of the second initial answer information is determined, and the key point information is clustered.

Specifically, the key point information may be extracted from the second initial answer information through a pre-trained answer extraction model, and then the same key point information may be clustered.

Step 604: The key feature information of the first target attribute is determined based on a second clustering result.

In a possible embodiment, the user terminal may further display the first search result supporting the parameter information of the first target attribute and a second search result supporting the key feature information. The first search result and the second search result may be included in the target search result or sent to the user terminal after the parameter information or the key feature information of the first target attribute is triggered.

Herein, the first search result and the second search result may be natural search results or processed search results.

Illustratively, the first search result may be determined by a method as follows:

In a possible embodiment, when the first search result corresponding to the parameter information of the first target attribute is determined, the server may initiate the search request carrying the parameter information of the first target attribute, and obtain a plurality of search results to be screened. Then, the plurality of search results to be screened are screened for first candidate contents that are related to the parameter information of the first target attribute based on the pre-trained reading comprehension model, and then plurality of the first candidate contents are input into the pre-trained answer extraction model, so as to obtain at least one first search.

Specifically, the answer extraction model may screen the plurality of first candidate contents for a plurality of second candidate contents that satisfy a third preset condition, and then the same or similar second candidate contents are clustered, so as to obtain at least one first search result corresponding to the triggered parameter information of the first target attribute.

The third preset condition may be illustratively that an authority score is higher than a first preset value, and the parameter relevance is higher than a second preset value. The parameter relevance is configured to indicate a relevancy between the first candidate content and the parameter information of the first target attribute.

Herein, the authority score may be preset for each search result, for example, according to the occupation, a number of fans, a professional title, education background, popularity, etc. of an author who publishes the search result. Illustratively, a high authority score is set for a search result published by a professional assessor and a low authority score is set for a search result published by an ordinary user.

The second search result may be determined by a method as follows:

In a possible embodiment, when determining the preview content of the second search result corresponding to the key feature information of the first target attribute, the server may initiate a search request carrying the key feature information, obtain a plurality of second search results, and screen the plurality of second search results for the third candidate content based on the pre-trained reading comprehension model. Then, the plurality of third candidate contents are screened for a plurality of fourth candidate contents that satisfy a fourth preset condition based on the pre-trained answer extraction model, and then the same or similar fourth candidate contents are clustered, so as to obtain the preview content of the second search result corresponding to the triggered key feature information.

The fourth preset condition may be illustratively that the authority score is higher than a third preset value, and a feature relevancy is higher than a fourth preset value. The feature relevancy is configured to indicate a relevancy between the third candidate content and the key feature information.

According to the method for displaying a search result, and the method for processing a search request provided by the examples of the disclosure, the search information may be obtained, and the parameter information and the key feature information of the first target attribute of the target object may be obtained. Then, the parameter information and the key feature information of the first target attribute are displayed in the first area of the search result page. Since the parameter information and the key feature information of the first target attribute are estimated information in which the user may be interested, this method can display a content for which the user wants to search for the user, and can further directly display the parameter information and the key feature information in which the user may be interested. Thus, the user is prevented from re-initiating the search and search efficiency is improved.

It can be understood by those skilled in the art that in the method of specific embodiments, a description order of the steps does not indicate a strict execution order or constitute any limitation to an implementation process, and a specific execution order of the steps should be determined according to their functions and possible internal logic.

Based on the same inventive concept, the example of the disclosure also provides an apparatus for displaying a search result corresponding to the method for displaying a search result. Since the principle of solving problems by the apparatus in the example of the disclosure is similar to that of the method for displaying a search result in the example of the disclosure, reference can be made to the implementation of the method for implementation of the apparatus, with repeated contents not to be repeated herein.

Figure 7:
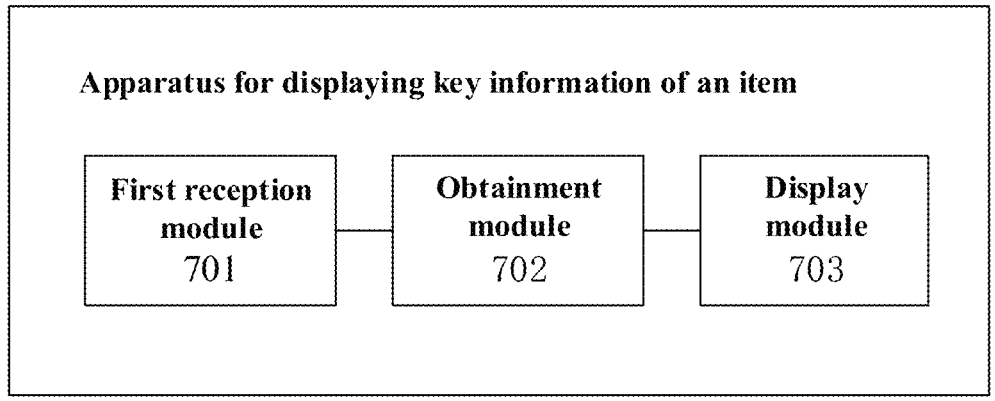
FIG. 7 shows a schematic architecture diagram of an apparatus for displaying a search result according to an example of the disclosure.

As shown in FIG. 7, a schematic architecture diagram of an apparatus for displaying a search result is shown according to an example of the disclosure. The apparatus includes: a first reception module 701, an obtainment module 702 and a display module 703.

The first reception module 701 is configured to receive search information, where the search information at least includes a keyword for characterizing a target object, and the target object belongs to a target category.

The obtainment module 702 is configured to obtain parameter information and key feature information of a first target attribute of the target object.

The display module 703 is configured to display the parameter information and the key feature information of the first target attribute in a first area of a search result page.

In a possible embodiment, the first target attribute is an attribute that affects a decision on the target object.

In a possible embodiment, the obtainment module 702 is further configured to:

obtain a first search result corresponding to the parameter information of the first target attribute, where a content of the first search result supports the parameter information of the first target attribute; and displaying number information of the first search result in the first area.

In a possible embodiment, the obtainment module 702 is further configured to:

obtain a second search result corresponding to the key feature information of the first target attribute, where a content of the second search result supports the key feature information of the first target attribute; and display a preview content of the second search result in a second area of the search result page.

In a possible embodiment, the display module 703 is further configured to:

display the parameter information of the first target attribute in the first area, and display the key feature information corresponding to the parameter information of the first target attribute at a position corresponding to the parameter information of the first target attribute.

In a possible embodiment, the display module 703 is further configured to:

display a target preview content of a second search result corresponding to triggered key feature information in the second area in response to a triggering operation on any key feature information, where the target preview content is obtained by clustering the second search results that are obtained by initiating, based on the triggered key feature information, a search.

In a possible embodiment, the display module 703 is further configured to:

display a first search result corresponding to parameter information of any first target attribute and highlight key feature information in the first search result in response to a triggering operation on number information of the first search result corresponding to the parameter information of the any first target attribute.

In a possible embodiment, target key feature information in the key feature information carries mark information, where the target key feature information is key feature information satisfying a first preset condition of corresponding popularity information.

After the displaying the parameter information and the key feature information of the first target attribute in a first area of a search result page, the display module 703 is further configured to:

display the target key feature information in a marked manner.

Figure 8:
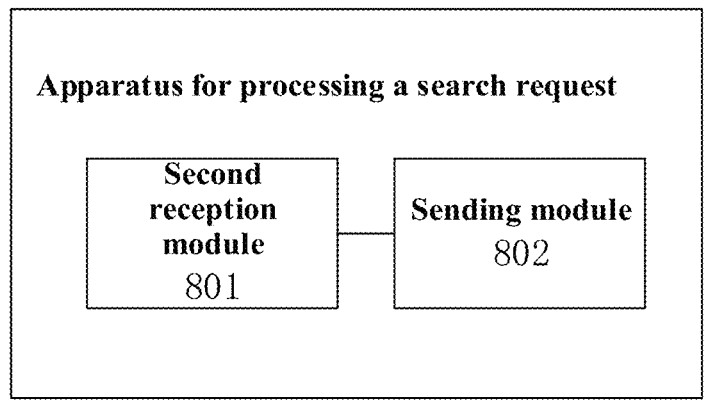
FIG. 8 shows a schematic architecture diagram of an apparatus for processing a search request according to an example of the disclosure.

Corresponding to the method for processing a search request shown in FIG. 4, as shown in FIG. 8, a schematic architecture diagram of an apparatus for processing a search request is shown according to an example of the disclosure. The apparatus includes: a second reception module 801 and a sending module 802.

The second reception module 801 is configured to receive a search request on a target object sent by a user terminal, where search information is carried in the search request, the search information at least includes a keyword for characterizing the target object, and the target object belongs to a target category.

The sending module 802 is configured to determine a target search result matching the search request and send the search result to the user terminal, where the target search result includes parameter information and key feature information of a first target attribute of the target object.

In a possible embodiment, the sending module 802 is further configured to determine the parameter information of the first target attribute of the target object according to a method as follows:

Target template search information matching the search request is determined, a search is initiated based on the target template search information, and a third search result is determined.

First initial answer information in the third search result that is included in respective search results and corresponds to the target template search information is extracted.

Key point information of the first initial answer information is determined, and the key point information is clustered.

The first target attribute of the target object and the parameter information of the first target attribute are determined based on a first clustering result.

In a possible embodiment, the sending module 802 is further configured to determine the key feature information of the first target attribute according to a method as follows:

A search is initiated based on the keyword of the target object included in the search information, and the first target attribute, and a fourth search result is determined.

Second initial answer information in the fourth search result that is included in respective search results and is related to the first target attribute of the target object is extracted.

Key point information of the second initial answer information is determined, and the key point information is clustered.

The key feature information of the first target attribute is determined based on a second clustering result.

For the description of the processing flow of the modules in the apparatus and the interaction flow between modules, reference can be made to the relevant description in the method example, which will not be described in detail herein.

Figure 9:
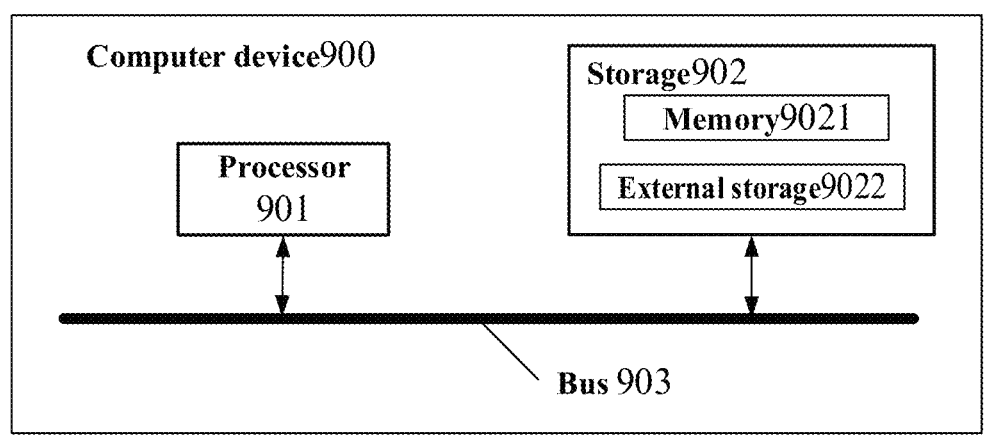
FIG. 9 shows a schematic structural diagram of a computer device according to an example of the disclosure.

Based on the same technical concept, a computer device is further provided according to an example of the disclosure. As shown in FIG. 9, a schematic structural diagram of a computer device 900 is shown according to an example of the disclosure. The computer device includes a processor 901, a storage 902 and a bus 903. The storage 902 is configured to store execution instructions, and includes a memory 9021 and an external storage 9022. The memory 9021 herein is also referred to as an internal storage, and is configured to temporarily store operation data in the processor 901 and data exchanged with the external storage 9022 such as a hard disk. The processor 901 exchanges data with the external storage 9022 through the memory 9021, and the processor 901 communicates with the storage 902 through the bus 903 when the computer device 900 runs, so as to cause the processor 901 to execute the following instructions:

Search information is received, where the search information at least includes a keyword for characterizing a target object, and the target object belongs to a target category.

Parameter information and key feature information of a first target attribute of the target object are obtained.

The parameter information and the key feature information of the first target attribute are displayed in a first area of a search result page.

In a possible embodiment, in the instructions executed by the processor 901, the first target attribute is an attribute that affects a decision on the target object.

In a possible embodiment, in the instructions executed by the processor 901, the method further includes:

A first search result corresponding to the parameter information of the first target attribute is obtained, where a content of the first search result supports the parameter information of the first target attribute; and number information of the first search result is displayed in the first area.

In a possible embodiment, in the instructions executed by the processor 901, the method further includes:

A second search result corresponding to the key feature information of the first target attribute is obtained, where a content of the second search result supports the key feature information of the first target attribute; and display a preview content of the second search result in a second area of the search result page.

In a possible embodiment, in the instructions executed by the processor 901, the method further includes:

The parameter information of the first target attribute is displayed in the first area, and the key feature information corresponding to the parameter information of the first target attribute is displayed at a position corresponding to the parameter information of the first target attribute.

In a possible embodiment, in the instructions executed by the processor 901, the method further includes:

A target preview content of a second search result corresponding to triggered key feature information is displayed in the second area in response to a triggering operation on any key feature information, where the target preview content is obtained by clustering the second search results that are obtained by initiating, based on the triggered key feature information, a search.

In a possible embodiment, in the instructions executed by the processor 901, the method further includes:

A first search result corresponding to parameter information of any first target attribute is displayed and key feature information in the first search result is highlighted in response to a triggering operation on number information of the first search result corresponding to the parameter information of the any first target attribute.

In a possible embodiment, in the instructions executed by the processor 901, target key feature information in the key feature information carries mark information, where the target key feature information is key feature information satisfying a first preset condition of corresponding popularity information.

After the displaying the parameter information and the key feature information of the first target attribute in a first area of a search result page, the method further includes:

The target key feature information is displayed in a marked manner.

Figure 10:
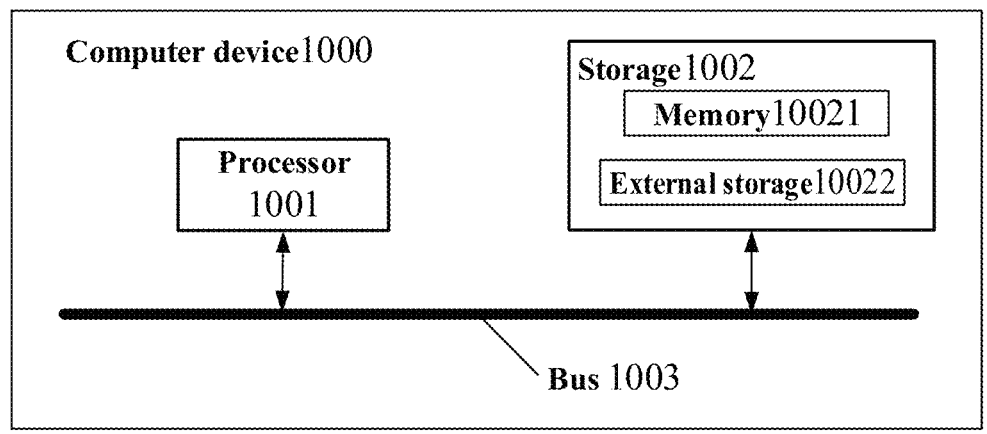
FIG. 10 shows another schematic structural diagram of a computer device according to an example of the disclosure.

Based on the same technical concept, another computer device is further provided according to an example of the disclosure. As shown in FIG. 10, a schematic structural diagram of a computer device 1000 is shown according to an example of the disclosure. The computer device includes a processor 1001, a storage 1002 and a bus 1003. The storage 1002 is configured to store execution instructions, and includes a memory 10021 and an external storage 10022. The memory 10021 herein is also referred to as an internal storage, and is configured to temporarily store operation data in the processor 1001 and data exchanged with the external storage 10022 such as a hard disk. The processor 1001 exchanges data with the external storage 10022 through the memory 10021, and the processor 1001 communicates with the storage 1002 through the bus 1003 when the computer device 1000 runs, so as to cause the processor 1001 to execute the following instructions:

A search request on a target object sent by a user terminal is received, where search information is carried in the search request, the search information at least includes a keyword for characterizing the target object, and the target object belongs to a target category.

A target search result matching the search request is determined and the search result is sent to the user terminal, where the target search result includes parameter information and key feature information of a first target attribute of the target object.

In a possible embodiment, in the instructions executed by the processor 1001, the method further includes: determining the parameter information of the first target attribute of the target object according to a method as follows:

Target template search information matching the search request is determined, a search is initiated based on the target template search information, and a third search result is determined.

First initial answer information in the third search result that is included in respective search results and corresponds to the target template search information is extracted.

Key point information of the first initial answer information is determined, and the key point information is clustered.

The first target attribute of the target object and the parameter information of the first target attribute are determined based on a first clustering result.

In a possible embodiment, in the instructions executed by the processor 1001, the method further includes: determining the key feature information of the first target attribute according to a method as follows:

A search is initiated based on the keyword of the target object included in the search information, and the first target attribute, and a fourth search result is determined.

Second initial answer information in the fourth search result that is included in respective search results and is related to the first target attribute of the target object is extracted.

Key point information of the second initial answer information is determined, and the key point information is clustered.

The key feature information of the first target attribute is determined based on a second clustering result.

The example of the disclosure further provides a computer-readable storage medium. The computer-readable storage medium stores a computer program, where the computer program executes steps of the method for displaying a search result and the method for processing a search request in the method examples described above when run by a processor. The storage medium may be a volatile or non-volatile computer-readable storage medium.

The example of the disclosure further provides a computer program product. The computer program product carries program codes, and the program codes include instructions that may be configured to execute steps of the method for displaying a search result and the method for processing a search request in the method examples described above. For details, reference can be made to the method example, which will not be repeated herein.

The computer program product may be implemented through hardware, software or their combinations. In an optional example, the computer program product is specifically embodied as a computer storage medium. In another optional example, the computer program product is specifically embodied as a software product, such as a software development kit (SDK).

Those skilled in the art can clearly understand that, for the convenience and conciseness of description, reference can be made to the corresponding processes in the method example for the specific working processes of the above system and apparatus, which will not be repeated herein. It should be understood that in the several examples provided by the disclosure, the system, the apparatus and the method disclosed can be implemented in other methods. The apparatus examples described above are merely schematic. For example, unit division is merely a logical function division and can have other division manners during actual implementation, for example, a plurality of units or components can be combined or integrated into another system, or some features can be omitted or not executed. On the other hand, the shown or discussed coupling or direct coupling or communication connection with each other can be indirect coupling or communication connection through some communication interfaces, apparatuses or units, and can be in electrical, mechanical or other forms.

The units described as separated parts can be physically separated or not, and the parts displayed as units can be physical units or not, that is, they can be located in one place or distributed to a plurality of network units. Some or all units can be selected according to actual needs to achieve the purposes of the solutions of the examples.

In addition, functional units in the examples of the disclosure may be integrated into one processing unit, or each unit may be physically present separately, or two or more units may be integrated into one unit.

If the functions are implemented in the form of the software functional units and sold or used as independent products, the functions can be stored in a processor-executable nonvolatile computer-readable storage medium. Based on such understanding, the technical solution of the disclosure can be embodied in the form of software products in essence or a part that contributes to the prior art or a part thereof, the computer software products are stored in the storage medium, and include several instructions to make one computer device (which can be a personal computer, a server, a network device, etc.) execute all or some steps of the method of the examples of the disclosure. The foregoing storage medium includes a USB flash drive, a read-only memory (ROM), a random access memory (RAM), a diskette or an optical disk, etc., which may store program codes.

Finally, it should be noted that the examples described above are merely specific embodiments of the disclosure, and are used to describe the technical solution of the disclosure, rather than limit the same, and the protection scope of the disclosure is not limited thereto. Although the disclosure has been described in detail with reference to the foregoing examples, those skilled in the art should understand that in the technical scope of the disclosure, the technical solution described in the foregoing examples can be still modified or conceivably changed, or some of the technical features therein can be equivalently replaced. However, these modifications, changes or equivalent replacements are not intended to depart the essence of the corresponding technical solutions from the spirit and scope of the technical solutions of the example of the disclosure, and should fall within the protection scope of the disclosure. Thus, the protection scope of the disclosure should be subject to a protection scope of the claims.

I claim:

1. A method for improvements of searching and displaying search results, comprising:
    displaying a search input box on a terminal device, wherein the search input box is configured to receive search keywords from a user associated with the terminal device;
    receiving, by the terminal device via the search input box, a keyword that is a name of a target object, wherein the target object belongs to a target category;
    transmitting a search request comprising the name of the target object to a server, wherein the server determines a plurality of components associated with the target object based on the name of the target object, the server determines parameter information and key feature information corresponding to each of the plurality of components, and the server computes a popularity value corresponding to each of the plurality of components based on historical searches for each of the plurality of components performed by the user and historical comments on each of the plurality of components posted by the user;
    receiving the parameter information, the key feature information, and the popularity value corresponding to each of the plurality of components associated with the target object from the server;
    ranking the plurality of components in an order indicating an estimated level of user interest in each of the plurality of components based on the popularity value associated with each of the plurality of components, wherein one of the plurality of components having a highest estimated level of user interest is ranked first in the ranking order;
    generating a search result page based on a template, the ranking order, the parameter information and the key feature information corresponding to each of the plurality of components associated with the target object; and
    displaying the search result page on the terminal device, wherein parameter information and key feature information corresponding to at least one subset of the plurality of components are displayed based on the ranking order in a first area of the search result page, wherein the search result page comprises component information associated with the target object and ranked based on user interest to prevent from re-initiating searches for the components of the target object and to improve searching efficiency.

2. The method according to claim 1, wherein each of the plurality of components is a component of the target object that affects a decision on the target object.

3. The method according to claim 1, further comprising:
    obtaining a search result corresponding to parameter information of a first component among the plurality of components, wherein a content of the search result corresponds to the parameter information of the first component; and displaying number information of the search result in the first area.

4. The method according to claim 1, further comprising:
    obtaining a search result corresponding to key feature information of a first component among the plurality of components, wherein a content of the search result corresponds to the key feature information of the first component; and displaying a preview content of the search result in a second area of the search result page.

5. The method according to claim 1, further comprising:
    displaying the parameter information of a first component among the plurality of components in the first area, and displaying the key feature information corresponding to the parameter information of the first component at a position corresponding to the parameter information of the first component.

6. The method according to claim 4, further comprising:
    displaying a target preview content of the search result corresponding to triggered key feature information in the second area in response to a triggering operation on any key feature information, wherein the target preview content is obtained by clustering the search results that are obtained by initiating, based on the triggered key feature information, a search.

7. The method according to claim 3, further comprising:
    displaying a search result corresponding to parameter information of any one of the plurality of components and highlighting key feature information in response to a triggering operation on number information of the search result corresponding to the parameter information of the any one of the plurality of components.

8. The method according to claim 1, wherein target key feature information in the key feature information carries mark information, wherein the target key feature information is key feature information satisfying a first preset condition of corresponding popularity information; and
    after the displaying the parameter information and the key feature information of the plurality of components in the first area of the search result page, the method further comprises:
    displaying the target key feature information in a marked manner.

9. A method for improvements of searching and displaying search results, comprising:
    receiving, by a server, a search request sent by a terminal device associated with a user, wherein search request comprises a keyword that is a name of a target object, wherein the target object belongs to a target category;
    determining a plurality of components associated with the target object based on the name of the target object;
    determining parameter information and key feature information corresponding to each of the plurality of components;
    computing a popularity value corresponding to each of the plurality of components based on historical searches for each of the plurality of components performed by the user and historical comments on each of the plurality of components posted by the user; and
    sending, by the server, the parameter information, the key feature information, and the popularity value corresponding to each of the plurality of components associated with the target object to the terminal device, wherein the terminal device is configured to:
    rank the plurality of components in an order indicating an estimated level of user interest in each of the plurality of components based on the popularity value associated with each of the plurality of components, wherein one of the plurality of components having a highest estimated level of user interest is ranked first in the ranking order;

generate a search result page based on a template, the ranking order, the parameter information and the key feature information corresponding to each of the plurality of components associated with the target object; and display the search result page on the terminal device, wherein parameter information and key feature information corresponding to at least one subset of the plurality of components are displayed based on the ranking order in a first area of the search result page, wherein the search result page comprises component information associated with the target object and ranked based on user interest to prevent from re-initiating searches for the components of the target object and to improve searching efficiency.

10. The method according to claim 9, further comprising:
determining the parameter information associated with the plurality of components of the target object according to a method as follows:
determining target template search information matching the search request, initiating a search based on the target template search information, and determining a first search result;
extracting first initial answer information in the first search result that is included in respective search results and corresponds to the target template search information;
determining key point information of the first initial answer information, and clustering the key point information; and
determining the plurality of components of the target object and the parameter information of the plurality of components based on a first clustering result.

11. The method according to claim 10, further comprising:
determining the key feature information associated with the plurality of components according to a method as follows:
initiating a search based on the keyword of the target object comprised in the search information, and the first component, and determining a second search result;
extracting second initial answer information in the second search result that is included in respective search results and is related to the first component of the target object;
determining key point information of the second initial answer information, and clustering the key point information; and
determining the key feature information of the plurality of components based on a second clustering result.

12. A computer device, comprising: a processor, a storage and a bus, wherein the storage stores a machine-readable instruction executable by the processor, the processor communicates with the storage through the bus when the computer device runs, and the machine-readable instruction, when executed by the processor, cause the computer device to:
display a search input box on a terminal device, wherein the search input box is configured to receive search keywords from a user associated with the terminal device;

receive, by the terminal device via the search input box, a keyword that is a name of a target object, wherein the target object belongs to a target category;

transmit a search request comprising the name of the target object to a server, wherein the server determines a plurality of components associated with the target object based on the name of the target object, the server determines parameter information and key feature information corresponding to each of the plurality of components, and the server computes a popularity value corresponding to each of the plurality of components based on historical searches for each of the plurality of components performed by the user and historical comments on each of the plurality of components posted by the user;

receive the parameter information, the key feature information, and the popularity value corresponding to each of the plurality of components associated with the target object from the server;

rank the plurality of components in an order indicating an estimated level of user interest in each of the plurality of components based on the popularity value associated with each of the plurality of components, wherein one of the plurality of components with a highest estimated level of user interest is ranked first in the order;

generate a search result page based on a template, the ranking order, the parameter information and the key feature information corresponding to each of the plurality of components associated with the target object;

display the search result page on the terminal device, wherein parameter information and key feature information corresponding to at least one subset of the plurality of components are displayed based on the ranking order in a first area of the search result page, wherein the search result page comprises component information associated with the target object and ranked based on user interest to prevent from re-initiating searches for the components of the target object and to improve searching efficiency.

13. The computer device according to claim 12, wherein each of the plurality of components is an attribute that affects a decision on the target object.

14. The computer device according to claim 12, wherein the computer device is further caused to:
obtain a search result corresponding to the parameter information of a first component among the plurality of components, wherein a content of the search result corresponds to the parameter information of the first component; and displaying number information of the search result in the first area.

15. The computer device according to claim 12, wherein the computer device is further caused to:
obtain a search result corresponding to the key feature information of a first component among the plurality of components, wherein a content of the second search result corresponds to the key feature information of the first component; and displaying a preview content of the second search result in a second area of the search result page.

16. The computer device according to claim 12, wherein the computer device is further caused to:
displaying the parameter information of a first component among the plurality of components in the first area, and displaying the key feature information corresponding to the parameter information of the first component at a position corresponding to the parameter information of the first component.

17. The computer device according to claim 15, wherein the computer device is further caused to:
- displaying a target preview content of a search result corresponding to triggered key feature information in the second area in response to a triggering operation on any key feature information, wherein the target preview content is obtained by clustering the search results that are obtained by initiating, based on the triggered key feature information, a search.

18. The computer device according to claim 14, wherein the computer device is further caused to:
- displaying a search result corresponding to parameter information of any one of the plurality of components and highlighting key feature information in the search result in response to a triggering operation on number information of the search result corresponding to the parameter information of the any one of the plurality of components.

19. The computer device according to claim 12, wherein target key feature information in the key feature information carries mark information, wherein the target key feature information is key feature information satisfying a first preset condition of corresponding popularity information; and
- wherein after the displaying the parameter information and the key feature information of the plurality of components in the first area of the search result page, the computer device is further caused to:
- displaying the target key feature information in a marked manner.

20. The computer device according to claim 19, wherein the marked manner comprises at least one of the followings:
- background color burn;
- addition of a preset icon; or
- use of a striking font color.

* * * * *